United States Patent [19]

Schleupen et al.

[11] 4,351,309

[45] Sep. 28, 1982

[54] SAFETY GAP FOR AN IGNITION SYSTEM IN AN INTERNAL COMBUSTION ENGINE

[75] Inventors: Richard Schleupen, Ingersheim; Reinhold Kaufmann, Oberriexingen; Dieter Raff, Schwieberdingen, all of Fed. Rep. of Germany

[73] Assignee: Robert Bosch GmbH, Stuttgart, Fed. Rep. of Germany

[21] Appl. No.: 165,557

[22] Filed: Jul. 3, 1980

[30] Foreign Application Priority Data

Jul. 28, 1979 [DE] Fed. Rep. of Germany ....... 2930771

[51] Int. Cl.³ ...................... B60R 25/04; F02B 77/00; F02P 1/00
[52] U.S. Cl. ........................... 123/630; 123/198 DC; 123/169 R; 200/19 DC; 339/111
[58] Field of Search ............ 123/630, 198 DC, 169 R; 200/19 DC; 339/111

[56] References Cited

U.S. PATENT DOCUMENTS

| | | | |
|---|---|---|---|
| 449,691 | 7/1936 | Chatfield | 123/630 |
| 2,231,845 | 2/1941 | Curran | 123/198 DC |
| 3,105,480 | 10/1963 | Farris | 123/630 |
| 3,720,284 | 3/1973 | Myers | 123/198 DC |
| 3,782,358 | 1/1974 | Lenz | 123/198 DC |
| 3,869,191 | 3/1975 | Tolnar, Jr. et al. | 339/111 |
| 4,236,494 | 12/1980 | Fairchild | 123/630 |

Primary Examiner—Raymond A. Nelli
Attorney, Agent, or Firm—Frishauf, Holtz, Goodman & Woodward

[57] ABSTRACT

To protect the ignition system against high over voltages upon removal of a load in the high voltage circuit, represented by the spark gap of a spark plug, and a distribution gap of a distributor, an electrically conductive terminal element, such as a flag, a spring biased tab, or a push spring which is connectible to ground or chassis is so located that, when the spark plug cable terminals are connected, the insulator of the spark plug cable terminal will be interposed between the flag and the high voltage terminal which is to be protected. The flag may be permanently spaced from the high voltage terminal—for example to prevent low voltage dc flow, when applied to the high voltage terminal of the coil; maybe spring biased to fit against a normally isolated terminal for example a spark plug distributor terminal; or maybe in form of a compression spring element which is pushed from a position adjacent a grounding cap into a position remote therefrom and where the normal plug insulator is attached by the high voltage pin terminal connection on a spark plug.

9 Claims, 2 Drawing Figures

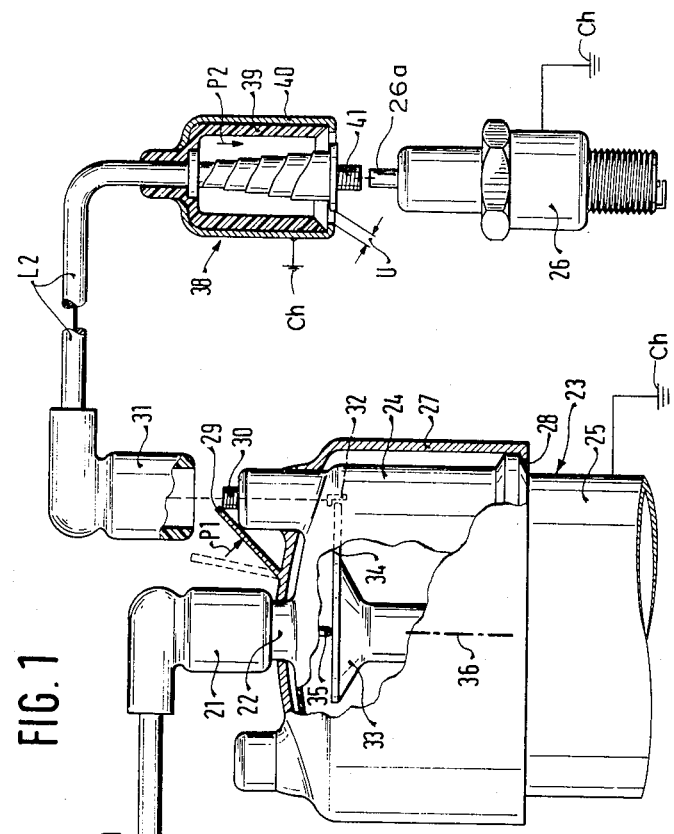
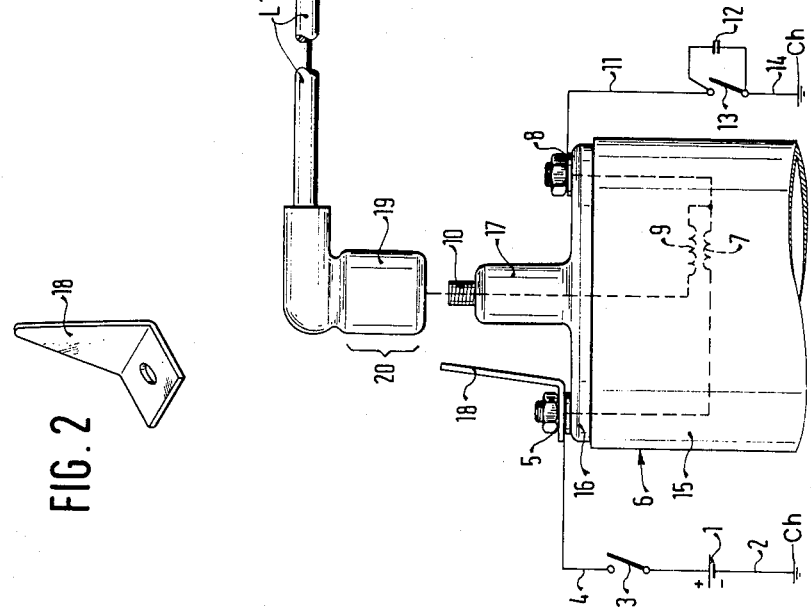
FIG. 1
FIG. 2

SAFETY GAP FOR AN IGNITION SYSTEM IN AN INTERNAL COMBUSTION ENGINE

The present invention relates to safety gaps in ignition systems, and, more particularly, in ignition systems in internal combustion engines.

BACKGROUND AND PRIOR ART

The use of safety spark gaps in ignition systems is known and is disclosed, for example in "Die elektrische Ausrüstung des Kraftfahrzeuges", Part 1, Zündung (Ignition) by Klaiber, 3rd Edition, 1950, Technischer Verlag (Technical Publisher) Herbert Cram, Berlin W55. In this publication, a safety spark gap is described in which pointed electrodes are affixed to the high voltage terminal and to the ground or reference voltage terminal. The gap between these two pointed electrodes is such that electrical breakdown will occur if the ignition voltage does not reach the spark plug. Any overvoltage resulting from malfunction in the ignition system is thus directed to a place where it can cause no damage, for example, where, otherwise, insulation breakdown might occur. The gap between the pointed electrodes must be carefully adjusted in such a manner that the breakdown voltage of the gap is above the breakdown voltage under normal operation at the spark gap; of the spark plug On the yet, the breakdown voltage at the safety gap must not be too high. Sufficient sensitivity to overvoltage must remain under all conditions, to prevent damage to insulated portions as for example flashover or burning of the insulation. It is thus rather difficult, in the spark gaps, to adjust the distance between the pointed electrodes in such a way that, on the one hand, normal operation of the spark plug is not impeded and, on the other hand, sufficient protection is offered for the various insulating portions.

THE INVENTION

It is an object of the present invention to provide a safety arrangement which protects the ignition system when spark plug cables are disconnected.

Briefly, means are provided which, when an insulated high voltage connection to the spark plug is removed, provides a grounding, or low breakdown path between the high voltage terminal and ground, or reference, or chassis connection.

In one form, the means are a terminal flag positioned close to the high voltage terminal of, for example, the spark plug. The air gap breakdown voltage between the flag and the high voltage terminal of the plug is less than the breakdown voltage when a plastic insulator, forming part of the spark plug high voltage terminal, is interposed. In another form, a resiliently biased flag may be used which, when a high voltage terminal is removed, for example, from a spark plug distributor terminal, snaps against the high voltage spark plug distributor terminal, but can be bent out of the engagement therewith when the respective spark plugs distributor terminal is interposed. To protect the spark plug end, the spark plug terminal of the distributor cable has a compressible spring thereon which increases the gaps between a thermal shield, connected to the engine block, and hence to chassis through the spark plug socket. When this end is pushed on the spark plug, it is raised off a position of close proximity with the shield, and thus permits interposition of the full insulator structure of the spark plug connecting insulator.

DRAWING DESCRIBING A PREFERRED EMBODIMENT

FIG. 1 shows an ignition system with a plurality of safety gaps in accordance with the present invention; and FIG. 2 shows an individual safety gap.

The ignition system shown in FIG. 1 is part of an internal combustion engine (not shown) which in turn is part of a motor vehicle (again, not shown). Energy for the ignition system is furnished by a DC voltage source 1, which may be the battery of the vehicle. The negative side of the battery is connected through a line 2 to reference or ground potential e.g. chassis ch of the vehicle while the positive side of the battery is connected through the ignition switch 3 to a line 4. Line 4 is in turn connected to a terminal 5 which is part of an ignition coil assembly 6. Specifically, terminal 5 is connected to one end of the primary winding 7 of the ignition coil. The other end of primary winding 7 is connected to a terminal 8 and is further connected through the secondary winding of the ignition coil to a high voltage terminal 10. A line 11 connects terminal 8 to a parallel circuit including a capacitor 12 and a switch 13. The parallel combination of capacitor and switch is connected through a line 14 to reference or ground potential. Ignition coil assembly 6 has a casing 15 which is made of metal, preferably iron. It has a cover 16 made of an insulating material, for example polyester. Cover 16 has connecting terminals 5 and 8 at its outer perimeter, while the high voltage terminal 10 is mounted on a projecting portion 17 which extends upward from the plane of the cover at the center thereof. A terminal element 18 is connected to terminal 5, the terminal element being made of electrically conductive material, for example copper. It has a pointed tongue-like shape illustrated in FIG. 2. The high voltage available at high voltage terminal 10 is taken off by use of a connecting plug 19. The walls of hollow cylinder 19 are made of an insulating material, a section 20 of which is interposed between the high voltage terminal 10 and terminal element 18 when plug 19 is in the operative condition. Section 20 of plug 19 thus forms an insulating barrier between high voltage terminal 10 and terminal 18.

The output side of plug 19 is connected to a line L1 which is connected to a second connecting plug 21. Connecting plug 21 is plugged onto a central connecting projection 22 of a distributor assembly 23. High voltage is applied to the distributor at this central projection connection. Distributor assembly 23 includes a housing 25 which is cup-shaped and made of metal, for example iron and electrically connected to chassis Ch. Housing 25 has a cover 24 made of an insulating material, for example polyester. As is well known, the distributor distributes the high voltage made available by the ignition coil in a predetermined order to a plurality of spark plugs, all represented symbolically by spark plug 26 in FIG. 1 and, when screwed into the engine cylinder block electrically connected to chassis Ch. Cover 24 is surrounded by a further cover 27 which is made of an electrically conductive, elastic plastic, for example polypropylene and carbon e.g. carbon black and is used as an interference suppressor. This cover 27 abuts the cup-shaped housing 25 at 28, so that it, as well as cup-shaped housing 25, is connected to ground potential. A grounding terminal 29 is formed onto cover 27. Grounding terminal 29 has the same shape as illustrated in FIG. 2 and is also made of a conductive plastic.

A pressure force P1 presses grounding terminal 29 against terminal 30 when no high voltage connection is being made, that is when the connecting plug 31 provided for this purpose is not actually plugged in. High voltage terminal 30 is electrically connected to a fixed electrode 32. The ignition voltage is applied to electrode 32 by electrical breakdown via a rotating electrode 34 mounted on an insulating body 33. Rotating electrode receives the ignition voltage pulse through a wiper 35. The dash dot line 36 indicates the shaft through which the rotational power is transmitted from the internal combustion engine to the rotating electrode 34.

When connecting plug 31 is plugged onto high voltage terminal 30, ground line 29 is forced into the position indicated by dashed lines by a force opposing the initial force P1. The ignition voltage pulse can then reach the sparl plug cap 38 via line L2. The spark plug cap 38 consists of a hollow cylindrical receptacle 39 made of an insulating material, for example polyester. A shield 40 at least partially surrounds receptacle 39.

Shield 40 is to be electrically conductive and at ground potential, so that it constitutes the ground line. A high voltage connection 41 is located in the interior of the spark plug cap. High voltage connection 41 is constructed as a telescopic spring which is made of electrically conductive material and which can be compressed in opposition to a prestress force P2 when the spark plug cap is plugged onto high voltage terminal 26a of spark plug 26, so that the gap U existing between the high voltage connection 41 and the shield 40 is increased when the high voltage connection is made.

OPERATION

The ignition system is ready for operation as soon as switch 3 is closed. When interrupter switch 13 is closed, current flows through the primary winding of the ignition coil and energy is stored for the next ignition process. When interrupter switch 13 is opened, the current in primary winding 7 is interrupted and a high voltage pulse is induced in the secondary winding 9. The high voltage pulse is available at high voltage terminal 10. If plug 19 is not plugged in, that is if the high voltage connection has not been made, an electrical breakdown will take place between high voltage termimal 10 and terminal element 18, thereby preventing the overvoltages. In the illustrated example, terminal element 18 is connected to ground through switch 3 and battery 1, and this assures that this connection is always maintained throughout the operation of the equipment. When plug 19 is plugged in, the section 20 of connecting plug 19 is located between high voltage terminal 10 and terminal element 18, so that the overvoltage for effecting breakdown is greatly increased. If the ignition circuit is in proper operating condition, the electrical breakdown will then take place at the spark plug 26.

If a high voltage pulse is created when plug 31 is not plugged in, this high voltage pulse will be connected to ground potential through grounding terminal 29, interference suppressor 27 and housing 25. The direct contact between high voltage terminal 30 and grounding terminal 29 prevents the formation of a spark by shunting any overvoltage which may be present. If plug 31 is plugged in, that is if the high voltage connection is made, grounding terminal 29 is pushed away from high voltage terminal 30 into the position indicated by dashed lines. The required breakdown voltage at this point is then sufficiently high that, if the ignition circuit is otherwise in proper operating condition, the breakdown will be place at spark plug 26.

When spark plug cap 38 is not plugged in, the gap U is so small that breakdown will occur at this location in response to any ignition voltage pulse which may be applied. When, however, cap 38 is mounted in its proper operating position, the gap U is substantially increased, because the elastic high voltage terminal 41 is compressed and therefore the front end of the high voltage terminal 41 is pushed away from the front face of the shield 40 which forms the ground line. If the ignition circuit is not interrupted by other causes, the electrical discharge will take place reliably at the electrodes of spark plug 6 in this case also.

Various changes and modifications may be made within the scope of the inventive concepts.

We claim:
1. Ignition system having
an ignition coil (6) having a housing (15);
a terminal (5) on the housing;
circuit means (1, 3, 4) connecting said terminal to a ground, chassis or reference potential (Ch);
and a coil high voltage terminal (10) on the housing, insulated with respect thereto;
at least one spark plug (26) having a shell connectible to the ground, chassis or reference potential (Ch) and a spark plug high voltage terminal (26a);
connection means (L1, L2) removably connectible and electrically interconnecting the coil high voltage terminal (10) and a spark plug high voltage (26a);
and a safety means to prevent occurrence of excessive high voltages when the connection means is removed from at least one of said terminals
comprising, in accordance with the invention the combination of
electrically conducting terminal means (18, 29, 40) connectible to the ground, chassis or reference potential (Ch) and positioned adjacent at least one of the high voltage terminals (10, 26a), and forming a ground connection therefore which is effective at the voltage difference between the respective high voltage terminal and the electrically conductive terminal means of substantially less than spark plug sparking voltage
with
insulator means (19, 20; 31; 39) on said connection means which is positioned, upon connection of the connection means to the respective high voltage terminal for interposition between the electrically conductive terminal means in the respective high voltage terminals, to place a zone of insulating material between said terminal means and the respective high voltage terminal, and thus increase the voltage difference required between the respective high voltage terminal and said terminal means for spark breakdown to a value substantially above that of the spark plug sparking voltage.
2. Ignition system according to claim 1 wherein said electrically conductive terminal means comprises a terminal flag (18) having a spacing from the associated high voltage terminal to form, upon removal of the insulator means (19, 20) a spark gap operative at a voltage substantially less than the spark plug sparking voltage and thereby forming a grounding connection through said lesser voltage sparking gap.

3. Ignition system according to claim 2 wherein said flag (18) is secured to the housing (15) of the ignition coil, and connected to the ground chassis or reference potential (Ch) through the primary ignition circuit of the ignition coil.

4. Ignition system according to claim 1 wherein said electrically conducting terminal means comprises a resiliently biased conducting element (29) positioned with respect to the associated high voltage terminal (30) to engage said high voltage terminal upon removal of the insulator means (31) from the high voltage terminal (30) and resiliently deflectible out of engagement with the respective high voltage terminal, upon association of the insulator means with the respective high voltage terminal.

5. Ignition system according to claim 4 wherein the system includes an element (23) having a metallic housing (25, 27) connected to ground chassis or reference potential (Ch);

and wherein said resiliently deflectible electrically conducting means (29) is secured to a portion of said housing and electrically connected to the ground chassis or reference potential through the housing.

6. Ignition system according to claim 1 wherein said connection means (L2) includes a terminal connecting plug (38);

the electrically conducting terminal means (40) comprises an electrically conductive element (40) positioned on said plug (38);

the insulator means comprises an insulating mass (39) positioned adjacent said electrically conductive element;

and a resiliently biased spring terminal (41) is provided, positioned opposite said electrically conductive element and movable between a position of close association with said electrically conductive element and a position in which said insulating mass (39) is interposed therebetween.

7. Ignition system according to claim 6 wherein said electrically conductive element (40) comprises a sleeve surrounding said plug (38);

said insulating mass (39) being positioned within said sleeve in form or a tubular shell open at one end;

and the resiliently biased spring terminal (41) comprises a compression spring, in a first and relaxed position, has an end portion closely adjacent said electrically conductive sleeve (40) and, in a compressed position and when engaged with a matching high voltage terminal (26a), compressed with the interior of the shell defined by the insulating mass and thereby interposing the insulating mass between the resiliently biased spring terminal and said electrically conductive sleeve.

8. Ignition system according to claim 7 wherein said compression spring (41) is engageable with the spark plug high voltage (26a), and the shell of insulating mass (39) is fitted to receive a terminal end portion of the spark plug.

9. Ignition system according to claim 7 wherein the electrically conductive sleeve (40) and the compression spring, when in relaxed condition, are spaced from each other by a small air gap (U) which has a breakdown voltage substantially less than a spark plug sparking voltage.

* * * * *